No. 830,203. PATENTED SEPT. 4, 1906.
F. H. BOGART.
UNIVERSAL JOINT.
APPLICATION FILED APR. 2, 1906.
2 SHEETS—SHEET 1.
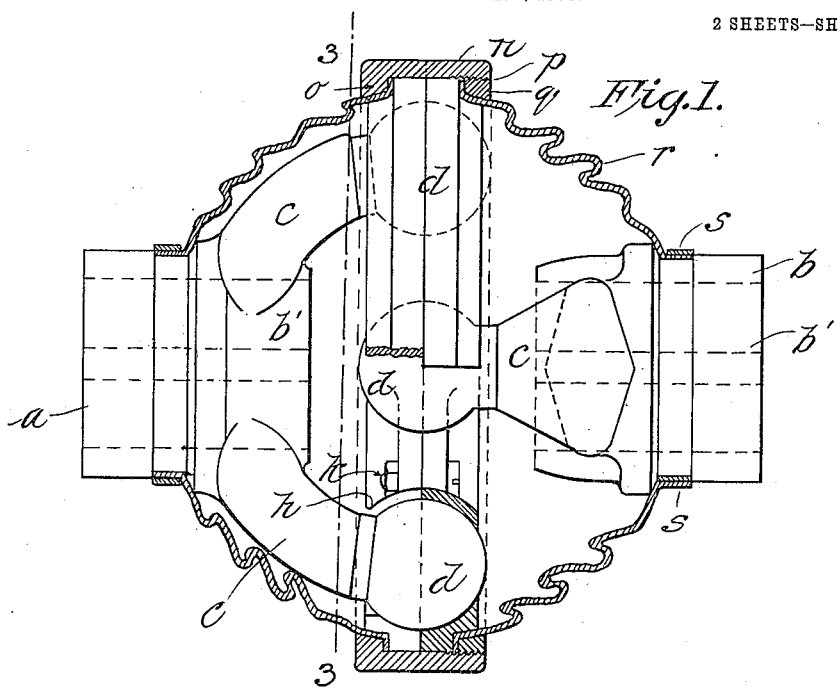
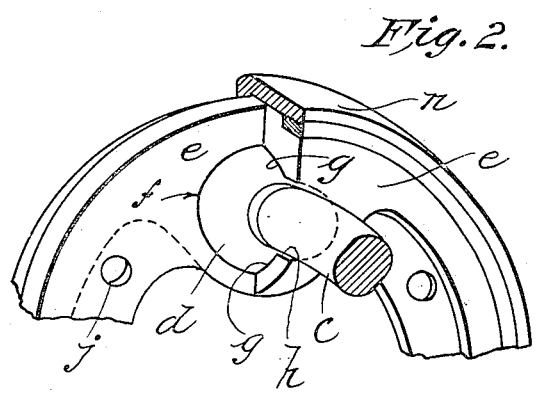
Witnesses:
H. L. Sprague
H. W. Bowen
Inventor.
Fred H. Bogart
by Chapin & Co.
attys No. 830,203. PATENTED SEPT. 4, 1906.
F. H. BOGART.
UNIVERSAL JOINT.
APPLICATION FILED APR. 2, 1906.
2 SHEETS—SHEET 2.
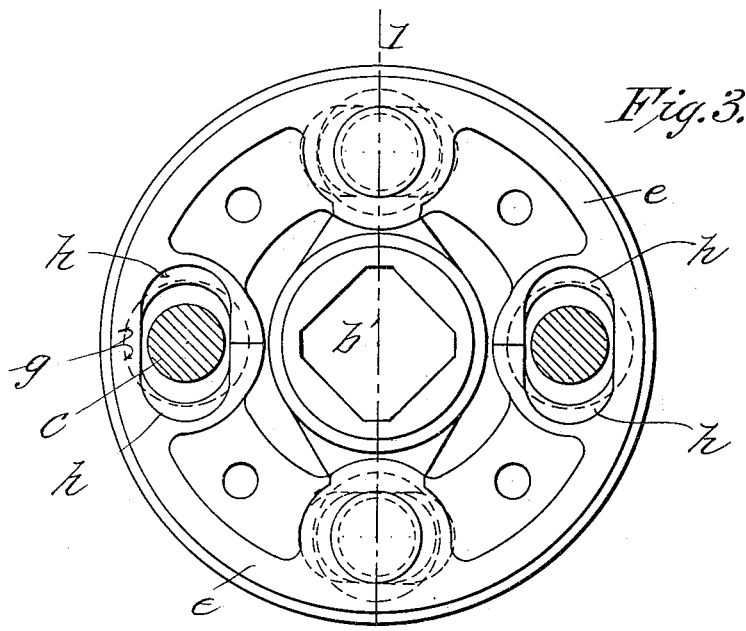
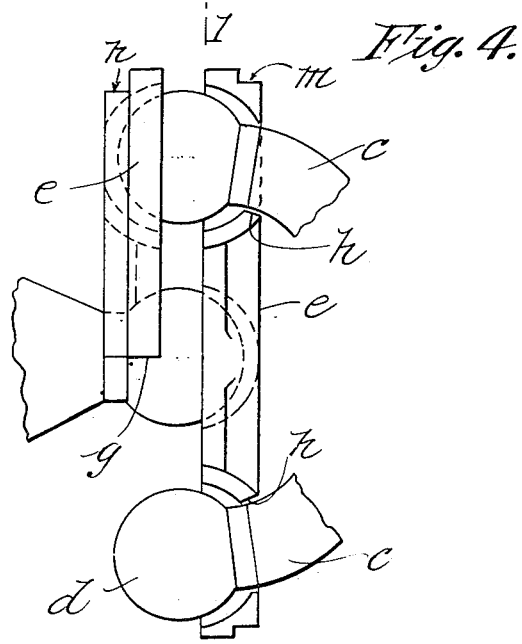

UNITED STATES PATENT OFFICE.

FRED H. BOGART, OF NEW BRITAIN, CONNECTICUT.

UNIVERSAL JOINT.

No. 830,203.  Specification of Letters Patent.  Patented Sept. 4, 1906.

Application filed April 2, 1906. Serial No. 309,339.

*To all whom it may concern:*

Be it known that I, FRED H. BOGART, a citizen of the United States of America, residing at New Britain, in the county of Hartford and State of Connecticut, have invented new and useful Improvements in Universal Joints, of which the following is a specification.

This invention relates to universal-joint construction, the object of the invention being to provide an improved construction of this class in which the several points of bearing in the two rectangularly-disposed planes are of spherical form and are provided with bearings in an equatorial ring comprising several parts to permit of completely inclosing the spherical bearing-points; and the invention consists in the construction described in the following specification and carefully pointed out in the claims appended thereto, the invention being clearly illustrated in the accompanying drawings, in which—

Figure 1 is a longitudinal vertical section of the assembled joint on the line 1 1, Fig. 3. Fig. 2 is a detail perspective view showing the manner of locking the balls in the holding or bearing rings and the openings through which the arms that carry the balls pass. Fig. 3 is a sectional view on line 3 3, Fig. 1, looking in the direction of the arrows. Fig. 4 is a detail showing how the parts are assembled.

Referring to the drawings, $a$ and $b$ designate two hubs with a rectangular opening $b'$, (shown in Fig. 3,) in which the shafts are secured. Cast or forged integral with each hub are two arms $c$, that lie in the same plane, as clearly shown in Figs. 1 and 3, and which are preferably curved, as shown, in order to occupy as little space as possible when the parts are assembled. The outer ends of the arms terminate in balls or spheres $d$, which constitute the bearing-points of the universal joint.

The joint, as shown, is made up of two sets of curved arms carrying the bearing-balls at their outer ends and placed in planes at right angles to each other in the spherically-formed sockets of the bearing-rings, (designated at $e$.) These bearing-rings are semicircular and have in one face thereof a hemispherical socket $f$, and two sockets that are each one-quarter of a hemisphere, as shown at $g$ in Figs. 2 and 4, on the dividing-line of the ring.

The bearing-rings $e$ are provided with openings or cut-out portions which communicate with hemispherical sockets of the opposite ring. They are provided with inclined shoulders, as shown at $h$, thus permitting the arms $c$ to have free movement for a predetermined distance.

The bearing-rings $e$ when assembled overlap each other, so as to bring the joints ninety degrees apart. The hemispherical socket in one ring is placed so that the dividing plane or line of the opposite bearing-ring will pass through the diametrical plane of the bearing-ball, as clearly shown in Fig. 2. The two quarter hemispherical sockets in these opposite bearing-rings form the remaining part of the spherical socket, so as to completely inclose the ball. The openings through the bearing-rings permit the requisite movement of the arms $c$ and are formed at the dividing-line of the two sets of bearing-rings, as clearly shown in Figs. 2 and 3.

The inner faces of the two sets of bearing-plates have broad accurately-turned surfaces. The bearing-rings $e$ are placed over the balls, and the ends of the arms $c$ are held together firmly by means of bolts $k$, which are passed through the holes $j$ of the bearing-rings $e$, the same being shown in Fig. 1. The outer edges of the two bearing-rings $e$ have a shoulder $m$ turned thereon for the purpose of receiving a union or coupling-band $n$, which has a downturned portion $o$, as designated in Fig. 1, on one side and an internal thread $p$ on the other side to engage the coupling-ring $q$, which is adapted to fit either one of the shoulders $m$ and engage the thread $p$ on the band $n$.

If it is desired to inclose the operative parts of the universal joint for the purpose of preventing dust or other foreign matter from injuring the same, I may use a casing $r$, of leather or other suitable material, the same being clamped between the downturned portion $o$ and the shoulder $m$ on one side of the coupling-band $n$ and between the shoulder $m$ and the clamping-ring $q$ on the other side of the coupling-ring and the portion of the casing adjacent the hub $a$ being secured to the same by means of a band $s$ or by any suitable means.

It will be seen that by means of this structure the hub at the right of Fig. 1 can move freely in a vertical plane to the extent limited by the shoulders $h$ in the clamping-ring $e$ and that the hub at the left of Fig. 1 can move freely in a plane at right angles thereto.

The universal joint herein described is one that can be quickly assembled by first placing one of the bearing-rings against the ball or spherical ends $d$ on one side and the opposite bearing-ring $e$ on the other side and securing the same together by the bolt $k$ and the coupling-band $n$.

I have shown and described the arms $c$ cast or forged integral with the hubs $a$ and $b$. This feature of construction, however, is not essential, although preferred.

Having thus described my invention, what I claim, and desire to secure by Letters Patent of the United States, is—

1. In a universal joint of the class described, hubs carrying arms integral therewith and terminating in spherical ends, a set of bearing-rings having sockets for engaging the spherical ends, and means for securing the parts together.

2. In a universal joint, hubs carrying arms integral therewith located in planes at right angles to each other, said arms having spherical ends, bearing-rings having sockets equally spaced therein, and means for clamping the bearing-rings to the spherical ends, the sets of bearing-rings being located in the same plane and having openings for the arms, whereby movement of the hubs in one plane is permitted.

3. In a universal joint, two hubs having arms integral therewith and terminating in spherical bearing-points, separable bearing-rings having sockets and shoulders therein to limit the movement of the arms, a casing for inclosing the sets of arms, and a coupling-ring for securing the parts together, the spherical bearing-points being located in an equatorial ring.

4. A universal joint comprising hubs carrying arms and having balls at their outer ends, said arms being curved and located in planes at right angles to each other, bearing-rings having sockets for receiving the balls, and means for holding the bearing-rings in place.

5. A universal joint comprising hubs carrying arms and having balls at their outer ends, said arms being curved and located in planes at right angles to each other, bearing-rings having sockets for receiving the balls, means for holding the bearing-rings in place, and means for clamping an inclosing casing to the bearing-rings.

FRED H. BOGART.

Witnesses:
K. I. CLEMONS,
HARRY W. BOWEN.